Nov. 11, 1924.  1,514,880
B. J. TRYNER
SANITARY DRINKING FOUNTAIN
Filed May 31, 1923
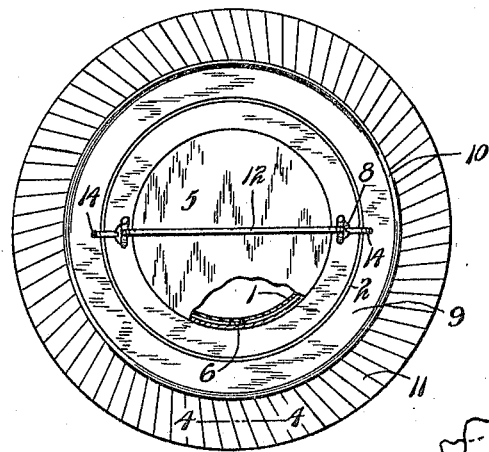
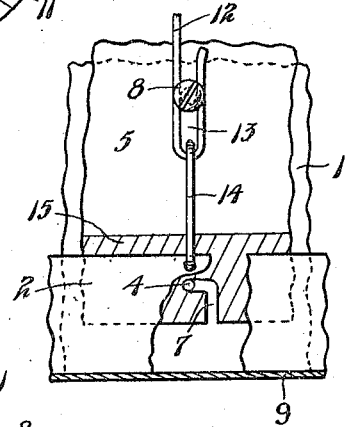
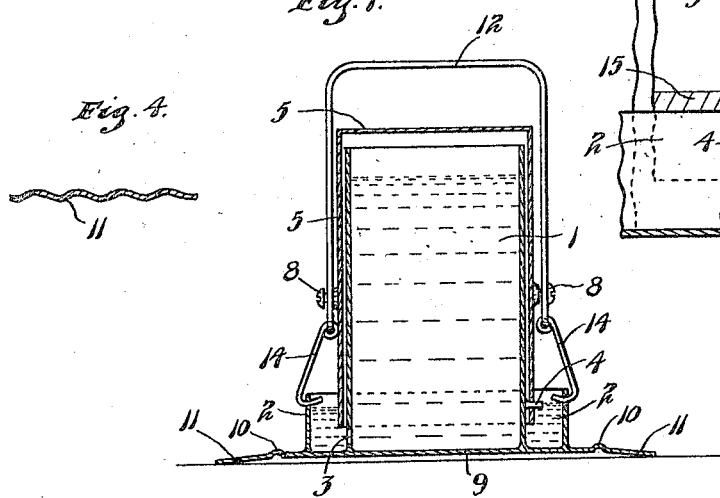
INVENTOR.
BEN J. TRYNER.
BY HIS ATTORNEY.
James F. Williams Patented Nov. 11, 1924.

1,514,880

UNITED STATES PATENT OFFICE.

BEN J. TRYNER, OF LE ROY, MINNESOTA, ASSIGNOR OF ONE-HALF TO MERRELL E. BOWERS, OF LE ROY, MINNESOTA.

SANITARY DRINKING FOUNTAIN.

Application filed May 31, 1923. Serial No. 642,433.

*To all whom it may concern:*

Be it known that I, BEN J. TRYNER, a citizen of the United States, residing at Le Roy, in the county of Mower and State of Minnesota, have invented certain new and useful Improvements in Sanitary Drinking Fountains; and I do hereby declare the following to be a full, clear, and exact description of the invention, such as will enable others skilled in the art to which it appertains to make and use the same.

This invention relates to a sanitary drinking fountain or drinking device for poultry and other stock. It is desirable to have a supply of drinking water always available for the poultry and to have automatic means for maintaining this supply. It is also very desirable to have a device affording such a supply which easily may be filled or emptied, which is not easily upset and which can be easily and efficiently cleaned.

It is an object of this invention, therefore, to provide a drinking device of simple construction which can easily be filled and emptied and which readily may be taken apart and thoroughly cleaned.

It is a further object of the invention to provide such a device having a wide base extending therearound which renders the device very stable and also affords a drained and sanitary dry platform upon which the poultry may stand.

It is a further object of the invention to provide such a simple and efficient device having means thereon by which it may be carried or transported, which means is also available for carrying a portion of the device when the same is to be filled.

These and other objects and advantages of the invention will more fully appear from the following description made in connection with the accompanying drawings in which like reference characters refer to the same parts throughout the different views, and in which, Fig. 1 is a central vertical section of the device;

Fig. 2 is a top plan view thereof, a small portion being shown in horizontal section;

Fig. 3 is a fragmentary view partly in side elevation and partly in vertical section shown on an enlarged scale; and Fig. 4 is a fragmentary vertical section taken substantially on the line 4—4 of Fig. 2.

Referring to the drawings the device comprises an upstanding container 1 preferably of cylindrical form and having an open upper end. This container is surrounded at its base by a cup 2 of much less height with which cup the container 1 communicates through an opening 3 adjacent its bottom. The container 1 has a pin 4 projecting therefrom at some distance above its bottom. A wide base member 9 surrounds the cup 2 and slopes outwardly therefrom. This base forms the support for the device and constitutes a platform upon which the poultry stands. Said base is provided at some distance from the cup 2 with an annular bead 10 and outward of the bead 10 is provided with spaced outwardly extending corrugations or crimps 11 which extend at a slight angle to the radii of said base. A cylindrical member 5, open at one end, is inverted and placed over the container 1. The member 5 is of slightly larger diameter than the member 1, so that when it is placed thereover, there is an annular space between the same and member 1. The parts are maintained in spaced relation by an outstanding rib 6 formed on the member 1, which rib is conveniently formed by the joining seam of said member. The member 5 is provided at its open end with an L-shaped slot 7 adapted to co-operate with the pin 4 to form a bayonet joint and thus secure the member 5 to the member 1. The member 5 has projecting from opposite sides thereof, trunnion members 8 illustrated as formed by headed screws seated in small lugs on said member. A handle forming bail member 12 is provided and is adapted to extend over the member 5 and has its end portions extending downwardly along the sides thereof and is provided with elongated loops 13 which embrace the trunnion members 8 inside of the heads thereof. Hook members 14 are pivotally connected to the loops 13 and depend therefrom so that their hooked portions may engage through openings formed adjacent the top of the cup 2. The member 5 is also provided adjacent its open end with a series of diagonal crimps or corrugations 15.

In operation, the water or other liquid is held in the member 1 and this liquid will flow out of said member through the opening 3 to the cup 2 until the level of the liquid rises above the bottom edge of the member 5 or above the slot 7 therein, after which a seal is provided so that no air can enter the members 1 or 5 and the flow is thus stopped. The poultry step onto and are supported upon the base 9 and can thus drink of the water in the cup 2. As the supply of water is used, so that the level thereof drops below the member 5 or the slot 7, more air will be admitted into the member 1 and more water will flow through the opening 3 automatically to maintain the water at uniform level. The outward slope of the base 9 insures that the same will be well drained in case of rain or in case that any water is spilled thereon. A clean, dry and sanitary footing is thus afforded for the poultry and the device will not tend to have a muddy place thereabout in which the poultry must stand. The member 1 may either be filled by temporarily placing a stopper in the opening 3 and then pouring the water therein, or the water may be placed in member 5 and the member 1 then inverted and placed therein after which the whole device can be again inverted to proper position. This latter method of filling the same is very convenient as the member 5 can thus be used to carry the water to the device from the pump or other source of supply. The device readily may be transported by grasping the handle 12 when the cup 2 and other parts will be supported by the hook members 14. When the device is so carried, the trunnions 8 will be retained in the loops 13 and objectionable swinging of the device will be prevented, said loops thus acting to steady the device when the same is carried. The trunnions 8 are closer to the open end of member 5 than to its closed end so that when said member is used to carry water to the device, it may be carried by the bail member 12, the trunnions 8 then seating in the bottom of loops 13. The member 5 is thus carried as a pail. The corrugations 11 on the base members 9 and 15 on the member 5 stiffen the edges thereof so that the same will not be easily bent or deformed. The spacing of members 1 and 5 creates an insulating space between the members 1 and 5 which tends to keep the water in container 1 cool in hot weather and also prevents the freezing thereof in cold weather. The member 5 is readily placed in position over the member 1 and locked thereto by a slight turning movement so as to engage the pin 4 in the slot 7. When the parts are disassembled, the same can easily and efficiently be cleaned as there are no inaccessible corners or crevices in the device. A clean and sanitary fountain is thus assured.

From the above description it is seen that applicant has provided a very simple and efficient drinking fountain. The same can be easily and inexpensively produced, readily assembled and disassembled and kept in clean and sanitary condition. The parts of the device are comparatively few and of very simple construction. The device has been amply demonstrated in actual use and found to be very efficient for the purpose intended.

It will, of course, be understood, that various changes may be made in the form, details, arrangement and proportions of the parts without departing from the scope of applicant's invention, which, generally stated, consists in a device capable of carrying out the objects above stated such as shown and described and set forth in the appended claims.

What is claimed is:

1. A sanitary drinking fountain for poultry comprising a cylindrical container having an open upper end, a cup surrounding said container and of comparatively small height, a cylindrical member disposed over said container and connected thereto, said container having an opening adjacent its bottom into said cup, and a bail handle member having means engaging said member to steady the same, said handle having means engaging said cup for supporting the same, whereby the device can be carried by said handle.

2. A sanitary drinking fountain for poultry comprising a cylindrical container having an open upper end, a cup surrounding said container and of comparatively small height, an inverted open ended cylindrical member disposed over and surrounding said container, headed trunnion members projecting from opposite sides of said member, a handle-forming bail having its ends extending downward at each side of said members and provided with elongated loops embracing said trunnions, and hooks swingingly depending from said loops and engaging in holes formed in the wall of said cup whereby the device can be carried by said bail.

3. A sanitary drinking fountain for poultry comprising a cylindrical container having an open upper end, a cup surrounding said container of comparatively small height, an inverted open ended cylindrical member disposed over and surrounding said container, headed trunnion members projecting from opposite sides of said member, a handle-forming bail having its ends extending downward at each side of said member and provided with elongated loops embracing said trunnions, said trunnions being disposed nearer the open end of said member than its closed end whereby said member when removed may be carried as a pail by said bail, said trunnions then being supported in said loops and links connecting said loops with the upper portion of said cup.

In testimony whereof I affix my signature.

BEN J. TRYNER.